United States Patent
Sandstrom et al.

(10) Patent No.: US 9,205,704 B2
(45) Date of Patent: Dec. 8, 2015

(54) TIRE HAVING TREAD WITH REPELLENT GROOVE SURFACE

(75) Inventors: Paul Harry Sandstrom, Cuyahoga Falls, OH (US); Junling Zhao, Hudson, OH (US); Aaron Scott Puhala, Kent, OH (US); John Joseph Andre Verthe, Kent, OH (US); Paul Bryan Maxwell, Kent, OH (US); Eric John Marazzi, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1934 days.

(21) Appl. No.: 11/862,224

(22) Filed: Sep. 27, 2007

(65) Prior Publication Data

US 2009/0084477 A1  Apr. 2, 2009

(51) Int. Cl.
| | |
|---|---|
| *B60C 11/00* | (2006.01) |
| *B60C 1/00* | (2006.01) |
| *B29D 30/52* | (2006.01) |
| *B32B 3/30* | (2006.01) |
| *B32B 25/14* | (2006.01) |
| *C08L 7/00* | (2006.01) |
| *C08L 21/00* | (2006.01) |
| *C08L 23/28* | (2006.01) |
| *B60C 11/13* | (2006.01) |
| *B32B 5/14* | (2006.01) |
| *B32B 3/04* | (2006.01) |

(Continued)

(52) U.S. Cl.
CPC ........... *B60C 1/0016* (2013.04); *B29C 47/0021* (2013.01); *B29D 30/52* (2013.01); *B32B 3/04* (2013.01); *B32B 3/30* (2013.01); *B32B 5/145* (2013.01); *B32B 25/14* (2013.01); *B60C 11/1346* (2013.04); *C08L 7/00* (2013.01); *C08L 21/00* (2013.01); *C08L 23/283* (2013.01); *B29C 47/003* (2013.01); *B29C 47/0016* (2013.01); *B29C 47/06* (2013.01); *B32B 2307/73* (2013.01); *B32B 2605/00* (2013.01); *B60C 11/005* (2013.01); *C08K 7/02* (2013.01); *C08L 9/00* (2013.01); *C08L 9/06* (2013.01); *C08L 23/16* (2013.01); *C08L 27/18* (2013.01); *C08L 97/00* (2013.01)

(58) Field of Classification Search
CPC .......................... B60C 11/1346; B60C 11/005
USPC ............... 152/209.5, 209.18; 156/123, 128.1, 156/128.6, 129
See application file for complete search history.

(56) References Cited

U.S. PATENT DOCUMENTS 2,608,537 A * 8/1952 Pollak .............................. 524/72
4,996,056 A * 2/1991 Blass .............................. 424/443

(Continued)

FOREIGN PATENT DOCUMENTS

| GB | 2351691 A * | 1/2001 | |
| JP | 9309976 | 12/1997 | ............... C08L 9/00 |

(Continued)

OTHER PUBLICATIONS

Translation for Japan 2001-287509 (no date).*

(Continued)

*Primary Examiner* — Steven D Maki
(74) *Attorney, Agent, or Firm* — Henry C. Young, Jr.

(57) ABSTRACT

The present invention relates to a tire having a rubber tread of a lug and groove configuration wherein at least a portion of surface of the grooves is comprised of an elastomeric layer having a repellent property.

2 Claims, 4 Drawing Sheets

(51) Int. Cl.
*B29C 47/00* (2006.01)
*B29C 47/06* (2006.01)
*C08K 7/02* (2006.01)
*C08L 9/00* (2006.01)
*C08L 9/06* (2006.01)
*C08L 23/16* (2006.01)
*C08L 27/18* (2006.01)
*C08L 97/00* (2006.01)

(56) References Cited

U.S. PATENT DOCUMENTS

| | | | |
|---|---|---|---|
| 5,728,311 A | 3/1998 | Patitsas et al. | 249/65 |
| 5,908,815 A * | 6/1999 | Shen | 508/206 |
| 6,013,218 A | 1/2000 | Patitsas et al. | 264/315 |
| 6,035,911 A * | 3/2000 | Matsumoto et al. | 152/209.5 |
| 6,231,026 B1 | 5/2001 | Patitsas et al. | 249/65 |
| 6,566,440 B2 * | 5/2003 | Kuroki et al. | 524/546 |
| 6,653,393 B2 * | 11/2003 | Ishii et al. | 524/546 |
| 7,064,171 B1 * | 6/2006 | Halasa et al. | 152/905 |
| 2004/0103966 A1 * | 6/2004 | Boes et al. | 152/209.5 |
| 2006/0229404 A1 | 10/2006 | Lechtenboehmer | 524/495 |
| 2007/0123631 A1 | 5/2007 | Halasa et al. | 524/493 |

FOREIGN PATENT DOCUMENTS

| | | | | |
|---|---|---|---|---|
| JP | 2001-287509 | * | 10/2001 | |
| JP | 2003238738 | | 8/2003 | B60C 1/00 |
| JP | 2005-281390 A | * | 10/2005 | |
| JP | 2005281390 | | 10/2005 | C08L 21/00 |
| JP | 2006-240583 | * | 9/2006 | |
| JP | 2006240583 | | 9/2006 | B60C 1/00 |
| KR | 20050051007 | | 6/2005 | C08L 21/00 |

OTHER PUBLICATIONS

Derwent abstract for Japan 2006-240583 (no date).*
Machine translation for Japan 2006-240583 (no date).*
Machine translation for Japan 2005-281390 (no date).*
European Search Report completed Jan. 23, 2009.

* cited by examiner

TIRE HAVING TREAD WITH REPELLENT GROOVE SURFACE

FIELD OF INVENTION

The present invention relates to a tire having a rubber tread of a lug and groove configuration wherein at least a portion of the surface of the grooves has a repellent property. The tread groove repellent property is for tires to be driven over wet roads, particularly through water on road surfaces, and for tires to be driven through water containing substrates such as, for example, mud. Such tire groove repellent property is based on (A) increased lubricity of a tire groove surface to promote a lower coefficient of friction within the tread grooves for water and/or for wet and dry substrates and/or (B) increased hydrophobicity to promote repellency within the tread grooves for water and/or water containing substrates such as, for example, mud.

BACKGROUND FOR THE INVENTION

Most vehicular tires have a rubber tread of a lug and groove configuration. Many tires are of a co-extruded cap/base construction, wherein the tread cap is an outer rubber layer which contains the lug and groove configuration.

The outer lug surfaces of the tread are normally intended to be the running surface of the tire to promote ground-contacting traction for the tread.

The grooves of the tread located between the tread lugs are normally intended to promote ground engaging grip for the tread.

It is appreciated that, for some tire treads, the tread lugs are in a form of individual lugs and/or of circumferential ribs. For the purpose of this invention, tread lugs and ribs are referred to herein as tread lugs, with intervening grooves, unless otherwise indicated.

When such lug and grooved configured tire treads are driven through water over roads, particularly hard surfaced road surfaces, which may contain standing or running water, it is important for the tread grooves to quickly expel the water to promote ground engaging tire tread traction on the road surface.

When such lug and groove configured tire treads are driven on or through soft wet substrates such as, for example when driving through mud, portions of the substrate (e.g. mud) can become lodged within the tread grooves in a sense of adhering to the surface of the tread grooves and which may at least partially clog at least a portion of the grooves to thereby adversely affect the ground engaging ability of the tread.

It is, therefore, desired to reduce adhesion, or adherence, of water and of wet and dry substrates to the tread groove surfaces, such as, for example, mud and dirt over which the tire tread travels, including mud which has dried within the tread grooves, and/or water itself without a significant substrate content, in a sense of providing increased lubricity to reduce the coefficient of friction of the groove surfaces insofar as water and various wet and dry substrates within the grooves is concerned and increased hydrophobicity to resist or retard water adhering to the tread groove surfaces and/or clogging of the tread grooves with water-containing substrates such as for example, mud (e.g. water-containing dirt) which may otherwise tend to adhere to the tread groove surfaces.

For this invention, such repellent property for the groove surfaces is provided by a thin polymer layer (e.g. elastomer layer) which constitutes at least a portion of the groove surface and which contains, or is comprised of, at least one repellent material within its composition and on its surface.

The presence of a hydrophobic property of the surface of the polymer layer (e.g. integral elastomer layer, namely an elastomer integral with the rubber of the tread groove over which it lies) on the tread groove surface is for the groove surface to tend to repel water and/or water-containing substrates, particularly mud, or water-containing dirt, to thereby reduce adhesion of water and/or at least a portion of the water-containing substrate to the groove surface and retard clogging of the tread grooves.

The presence of a lubricity property of the surface of the polymer layer on the surface of the tread groove (e.g. elastomer layer) is for the groove surface to promote a reduced (e.g. lower) dry and particularly wet coefficients of friction to thereby retard, or prevent, adhesion of water and/or wet and dry substrates such as dirt or dried mud to the groove surface to reduce clogging of the tread grooves and/or to improve the ground-gripping ability of the tread.

For this invention, the higher hydrophobicity and lubricity properties for the groove surfaces is promoted by providing the aforesaid polymer layer (e.g. integral elastomer layer) with a dispersion of at least one of hydrophobic and lubricant materials. Therefore, at least a portion of the groove surfaces contains at least one of, or a combination of, hydrophobic and lubricant materials provided by said polymer (e.g. elastomer) layer.

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

In the description of this invention, the term "phr" refers to parts of a respective material per 100 parts by weight of rubber, or elastomer. The terms "rubber" and "elastomer" may be used interchangeably unless otherwise indicated. The terms "cure" and "vulcanize" may be used interchangeably unless otherwise indicated.

For this description, the term "butyl rubber" relates to a copolymer of isobutylene and conjugated diene (e.g. isobutylene and a minor amount of isoprene) and is intended to include halobutyl rubber (halogenated butyl rubber) such as for example, bromobutyl and chlorobutyl rubber, unless otherwise indicated.

SUMMARY AND PRACTICE OF THE INVENTION

In accordance with this invention, a tire having a rubber tread configured with lugs and grooves is provided wherein at least a portion of the tread groove walls are comprised of a water repellent layer;

wherein said water repellent layer is comprised of:

(A) at least one polymer selected from rubber elastomers and thermoplastic elastomers, and (B) a dispersion within said elastomer(s) of said water repellent layer and on the visible surface of said water repellent layer comprised of at least one of:

(1) a lubricant material having water repellency;

(2) a hydrophobic material having water repellency, or (3) a combination of said lubricant material and said hydrophobic material.

In further accordance with this invention, said tire having a rubber tread configured with lug and grooves is provided wherein at least a portion of the tread groove walls are comprised of a water repellent layer for rolling said tire through a road surface containing water on its surface to promote repelling said water from said water repellent layer-containing tread grooves. For such purpose, said road surface is a relatively hard surface and said water contains a minimal content, if any, of substrate other than said water. Accordingly, said tread contains grooves for which said water repellent layer is repellent for water which intrudes within the tread grooves from a hard road surface over which the tire travels which contains water thereon. In practice, said water on said road surface contains only a minimal substrate content, if any. (for example, less than about 10 weight percent of substrate such as for example, dirt).

In additional accordance with this invention, said tire having a rubber tread configured with lug and grooves is provided wherein at least a portion of the tread groove walls are comprised of a water repellent layer for rolling said tire through a wet (water-containing) substrate to promote repelling said wet substrate from said repellent layer-containing tread grooves. For such purpose, said wet substrate is sufficiently soft to intrude within a portion of said tread grooves as the tire rolls through the wet substrate, particularly where said wet substrate contains a significant substrate content (e.g. mud). Accordingly, said tire tread contains grooves for which said water repellent layer is repellent for said wet substrate which intrudes within the tread grooves through which the tire travels. In this manner, then, such tread groove surfaces might be considered as being ground-contacting in the sense of the wet substrate, or ground, which intrudes within the tread grooves. In practice, said wet substrate contains a significant substrate content (for example at least about 15 weight percent of substrate content such as for example, dirt).

Said rubber elastomers are cured in a sense of being curable with sulfur and/or organic peroxides to form said repellent layer.

It is preferred that the rubber elastomers are diene-based elastomers.

Various thermoplastic elastomers might be referred to, for example, in *Thermoplastic Elastomers*, Second Edition, 1996, edited by Geoffrey Holden et al, published by Hanser Publishers.

In one embodiment of the invention, after manufacturing the tire, the thin water repellent layer may removed from the running surfaces of the tread lugs, if appropriate, by abrading it away or by allowing it to simply quickly wear away during use of the tire.

In one embodiment of the invention, said rubber elastomer for the water repellent layer is a conjugated diene based elastomer.

In a further embodiment of the invention, said rubber elastomer is comprised of a copolymer of isobutylene and conjugated diene (referred to herein as butyl rubber), halogenated butyl rubber, brominated copolymers of para methyl styrene and isobutylene and/or ethylene/propylene/non-conjugated diene (EPDM) terpolymer.

Representative of EPDMs are, for example, ethylene/propylene/non-conjugated diene terpolymers which contain, for example, from about 1 to about 15 weight percent units derived from said non-conjugated diene. Representative non-conjugated dienes for said terpolymer elastomer are, for example, dicyclopentadiene, ethylidene norbornadiene, and hexadiene.

In another embodiment of the invention, said thermoplastic elastomer may be, for example, thermoplastic polyurethane polymers which may sometimes be referred to as "TPUs", or thermoplastic polyurethanes such as, for example, various of those mentioned in the aforesaid *Thermoplastic Elastomers* publication.

In one embodiment, said polymer may be a blend of one or more of said diene-based elastomers, isobutylene copolymers, EPDM polymer and, optionally, cured thermoplastic polymers (TPUs).

Representative of such diene-rubber elastomers are, for example, polymers of at least one of isoprene and 1,3-butadiene and copolymers of styrene with at least one of isoprene and 1,3-butadiene.

Representative examples of such conjugated diene-based elastomers are, for example, cis 1,4-polyisoprene (natural or synthetic cis 1,4-polyisoprene rubber), cis 1,4-polybutadiene, styrene/butadiene copolymers (emulsion and solution polymerization prepared), styrene/isoprene/butadiene terpolymers as well as styrene/isoprene/styrene and styrene/butadiene/styrene block copolymers.

In one aspect, it may be desirable for said rubber elastomer layer to be an elastomer composition comprised of one or more of said conjugated diene-based elastomers. In such case, it may be desirable to exclude any appreciable amount, preferably to be exclusive of, low unsaturation elastomers such as, for example, isobutylene copolymers, particularly butyl rubber in a case where it may desired for the elastomer of the rubber layer to be composed entirely of a conjugated diene-based rubber.

In another aspect, it may be desirable for said elastomer layer to be an elastomer composition comprised of low unsaturation isobutylene based elastomers comprised of, for example, said butyl rubber, halogenated butyl rubber or EPDM rubbers or their combination.

In a further aspect, it may be desirable for the elastomer layer to be an elastomer composition comprised of a combination of said conjugated diene-based elastomer(s) and at least one of said butyl rubber and EPDM elastomers.

In a particular embodiment of the invention, said dispersion within and on the surface of said repellent layer is at least one lubricant material having a water repellency property.

In a particular embodiment of the invention, said dispersion within and on the surface of said repellent layer is at least one hydrophobic material having a water repellency property.

In another embodiment of the invention, said dispersion within and on the surface of said repellent layer is a combination of at least one repellent and at least one hydrophobic material having water repellency properties.

It is recognized that a lubricant material may also have hydrophobic attributes and that a hydrophobic material may also have lubricant attributes insofar as promoting water repellency for water and for water-containing substrates.

In practice, said elastomer of said polymer layer may be comprised of at least one elastomer comprised of at least one of:

(A) conjugated diene-based elastomer comprised of a polymer of at least one diene comprised of isoprene and 1,3-butadiene and copolymer of styrene and/or alpha methylstyrene with at least one diene comprised of at least one of isoprene and 1,3-butadiene and their mixtures, (B) butyl rubber comprised of at least one of:
  (1) butyl rubber as a copolymer of isobutylene and conjugated diene comprised of isoprene,
  (2) halogenated butyl rubber comprised of chlorobutyl rubber bromobutyl rubber, and their mixtures, (C) brominated copolymers of para methylstyrene and isobutylene;

(D) ethylene/propylene copolymers (EP elastomers) and ethylene/propylene/non-conjugated diene terpolymer elastomers (EPDM elastomers), and (E) elastomeric cured thermoplastic polyurethanes (e.g. TPUs)

In one embodiment, such elastomer-based repellent rubber layer for said groove surface is co-extruded with and co-vulcanized with the tire tread and is thereby integral with the rubber tread and associated tread grooves, particularly where the elastomer is a diene-based elastomer.

In practice, said water repellent rubber layer may contain, for example, from about 2 to about 50, alternately from about 2 to about 20, phr of said water repelling lubricant and/or hydrophobic material, depending upon the choice of lubricant and/or hydrophobic material and upon the degree of repellency of water and various water-containing substrates desired for the rubber layer.

In practice, the water repellent rubber layer may desirably be a relatively thin layer such as, for example, having a thickness in a range of from about 0.05 to about 2.5, alternately, and usually more preferably, from about 0.12 to about 0.5 millimeters (mm), depending somewhat upon the size of the tire, nature of the tread grooves and intended use for the tire.

In practice, various water lubricity promoting materials, and their mixtures, (lubricity promoting materials may be referred to herein as being lubricants and which may also add hydrophobicity to the rubber layer) may be used and contained within and on the surface of the tread groove polymer (e.g. elastomer) layer composition including, for example and not intended herein to be limiting, at least one of graphite, lignin and polytetrafluoroethylene short fibers or powder as well as lecithin, polysiloxane polymers, polypropylene polymers, polyethylene polymers or polyalkene polymers so long as they provide a water repellency property for the rubber layer.

In some embodiments, as indicated above, one or more of various water (including wet substrate) lubricity promoting materials may also serve as hydrophobation promoting materials for the tread groove layer elastomer composition.

Heretofore, various lubricants have been suggested for use in or have been used in various butyl rubber-based tire cure bladders in a tire curing press, or tire mold, to provide lubricity between the surface of the bladder composed of a low unsaturation butyl rubber and an associated innerliner of a tire being cured in the tire mold containing such tire cure bladder in order to prevent sticking and/or curing of the butyl rubber bladder to the tire inner liner as the tire is being cured at an elevated temperature and pressure in the tire mold. For example, see U.S. Pat. Nos. 5,728,311, 6,013,218, and 6,231,026.

Use of such lubricants, however, for reducing a coefficient of friction and thereby adhesion of substrates other than uncured rubber surfaced substrates, such as, for example, dirt and mud to the surface of a cured tire groove is considered herein to be novel and a significant departure from past practice.

Use of hydrophobic materials and lubricants to provide a release capability for water and water containing substrates (e.g. wet substrates such as for example mud) which intrude within a tire tread groove is believed to be novel and a significant departure from past practice.

Use of such combination of various lubricants and hydrophobic materials in an polymer layer, particularly an elastomeric layer which forms a surface of a tire groove is novel and a significant departure from past practice.

In one aspect, the repellent polymer layer (e.g. elastomer layer) within the tread grooves is desirably exclusive, or at least substantially exclusive, of the running surface of the tread lugs and is thereby intended to have a minimal, if any, contact with the road to therefore have minimal, if any, effect upon the wear and traction characteristics of the running surface of lugs of the tire tread.

In another aspect, for the manufacture of the tire tread, a portion of the repellent layer may extend over a portion of the running surface of the tire in addition to being contained within the tread grooves. In this case the portion of the repellent layer may be removed from the tread running surface by abrading it away after manufacture of the tire or by being allowed to wear away by normal use of the tire.

In one embodiment, a method of preparing the tire of claim 1 may comprise co-extruding said repellent rubber layer in its uncured form with tire tread rubber strip in its uncured form to form an uncured rubber tire tread strip composite, building an uncured rubber tire having said uncured tire tread rubber strip composite positioned circumferentially around the outer portion of an uncured tire rubber carcass to form an assembly thereof, and subsequently co-vulcanizing the said tire assembly in a suitable mold at an elevated temperature and pressure to form a cured rubber tire having a cured rubber tread having configuration comprised of lugs and intervening grooves between said lugs, wherein said repellent layer is a cured repellent rubber layer on the outer surface of said tread including the outer surface of said tread grooves.

In practice, such method may further comprise removing said cured repellent rubber layer from the running surfaces of said tread lugs by abrading it away, or in an alternative, allowing it to wear away during use of the tire, particularly where said repellent layer contains carbon black reinforcement comprised of rubber reinforcing carbon black having an iodine value in a range of from about 10 to about 60 g/kg, ASTM Test D1510, in combination with a DBP (dibutyl phthalate) value in a range of from about 50 to about 140 cc/100 g, ASTM Test D2414, (such as for example a rubber reinforcing carbon black having an ASTM designation of N550, N660 or N754) to promote a faster wearing rubber composition.

For a further understanding of the invention, drawings are presented to depict a tire with tread of a cap/base construction which is composed of lugs and grooves.

THE DRAWINGS

Figure 1:
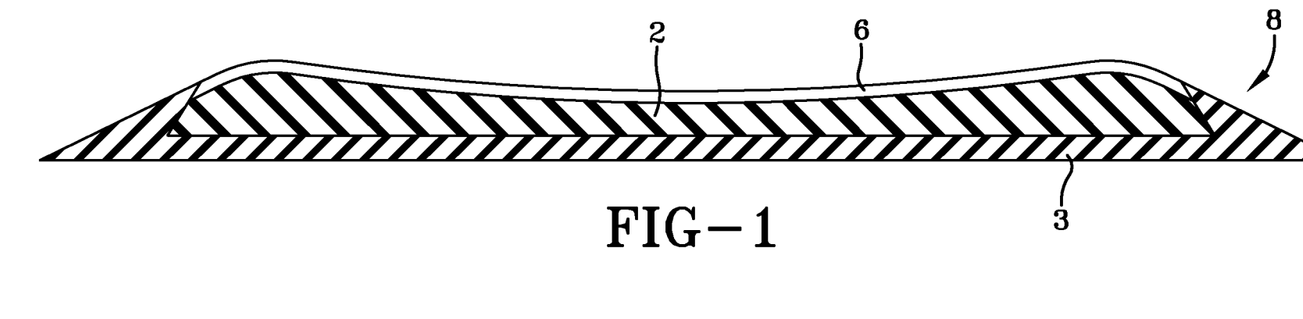
FIG. 1 is a cross-section of an uncured rubber tread strip.

In FIG. 1, a cross-section of an uncured, shaped, tread strip (8) is shown which is comprised of co-extruded elements as what will become a tread cap (2), tread base (3) and repellent elastomeric layer (6), all composed of diene-based elastomer compositions in which the elastomeric repellent layer (6) contains a combination of lubricant and hydrophobic materials wherein the lubricant is at least one of lecithin, graphite and polytetrafluoroethylene short fibers (micro fibers) and the hydrophobic material is lignin and said polytetrafluoroethylene micro fibers. It is envisioned that said polytetrafluoroethylene micro fibers may present both lubricant and hydrophobicity properties for the elastomeric composition.

Figure 2:
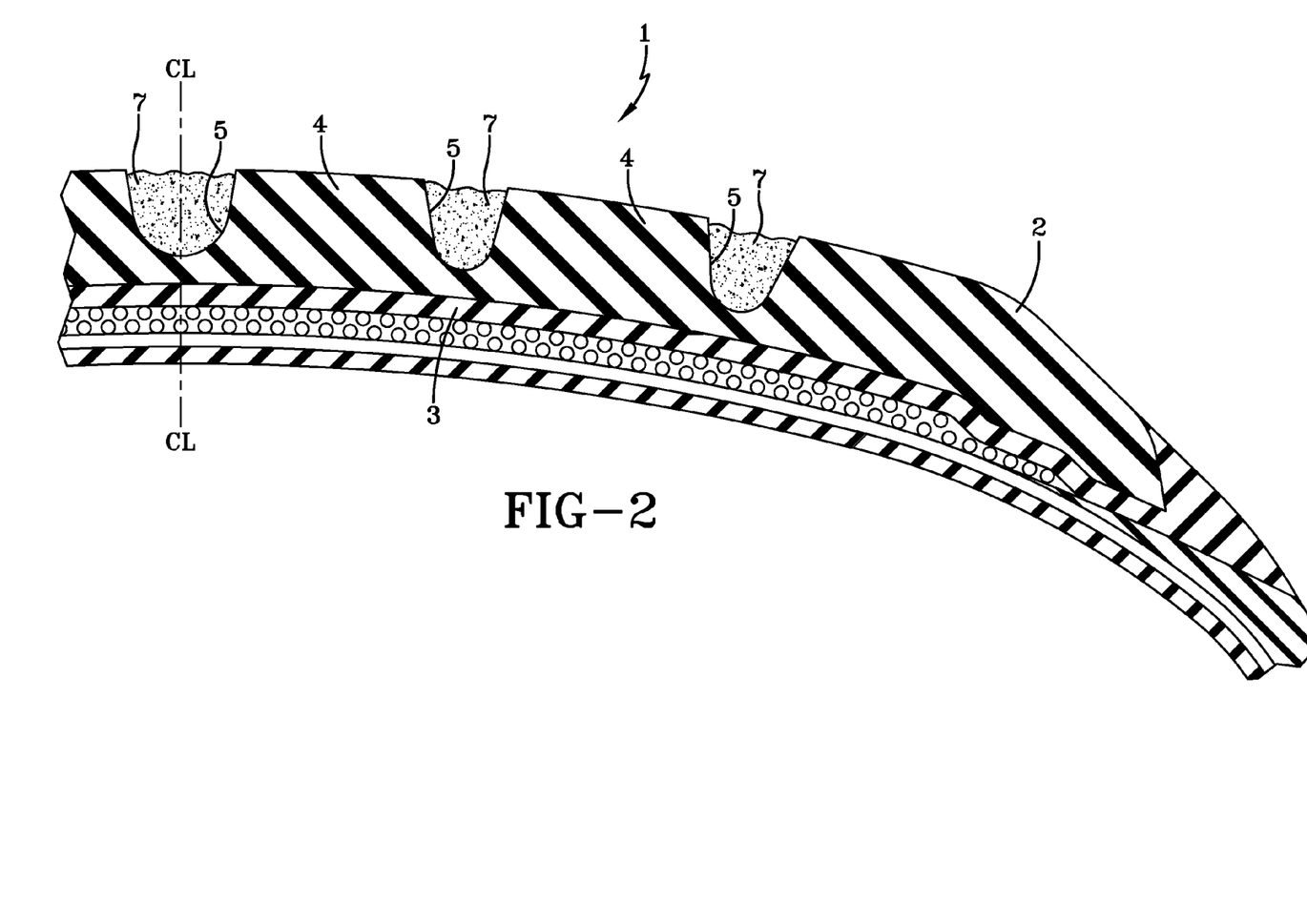
FIG. 2 is a partial cross-section of a cured rubber tire tread of a cap/base construction configured with lugs and grooves wherein at least a portion of the grooves are clogged with mud.

In FIG. 2, a partial tire cross-section (1) is shown having a tread of a cap/base configuration with an outer tread rubber cap layer (2) composed of lugs (4) and grooves (5) and underlying tread rubber base layer (3). The tread grooves (5) are clogged with mud (water-containing dirt) (7) and therefore have reduced ground engaging capability.

The grooves (5) for FIG. 2 do not have a water or wet substrate repellent layer on their surfaces.

Accordingly, the thread grooves (5), as indicated above, have a visually observable reduced ground engaging ability because of the presence of the mud (7) within the grooves (5).

Figure 3:
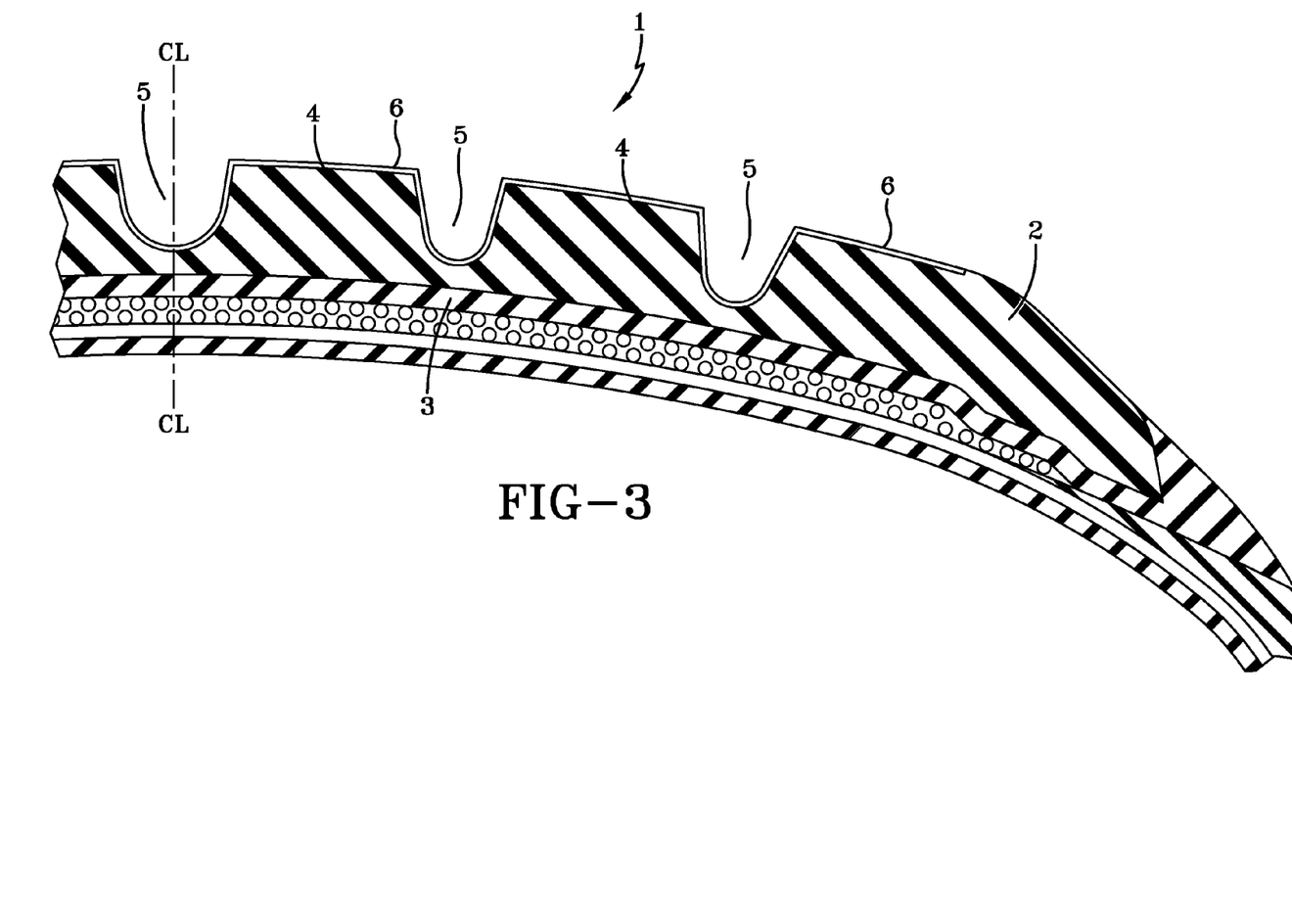
FIG. 3 is a partial cross-section of a cured rubber tire tread of a cap/base construction configured with lugs and grooves wherein the exposed face of the grooves and running surface of the tread is a polymer-based repellent layer, namely, for the purposes of FIG. 3, an elastomer-based repellent layer.

FIG. 3 depicts a newly molded tire cross-section (1) which is similar to FIG. 2, but without the mud (7) in the grooves (5), in which the water and wet substrate repellent elastomer layer (6) extends from the tread grooves (5) over the running surface of the tire tread.

Figure 4:
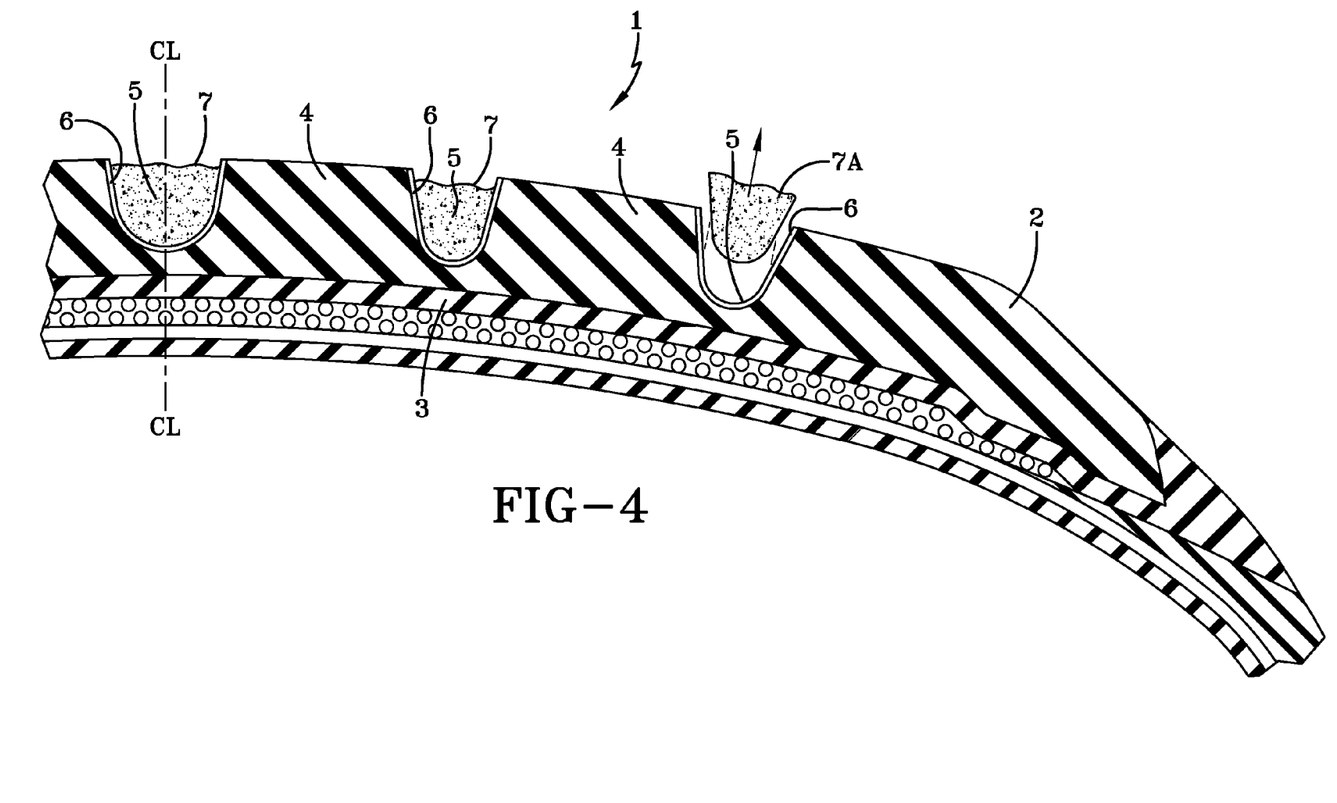
FIG. 4 is a partial cross-section of a cured rubber tire tread of a cap/base construction configured with lugs and grooves wherein the exposed face of the grooves is a polymer-based repellent layer, namely, for the purposes of this FIG. 4, an elastomer-based repellent layer.

FIG. 4 is similar to FIG. 2 except that its tread grooves (5), inclusive of the walls and bottom portions of the grooves, contain surfaces composed of a co-extruded, co-vulcanized elastomeric repellent layer (6) wherein its exposed surface has a release property for the wet substrate (mud), (7) which intrudes within the grooves (5). The clogging mud (7) in the grooves (5) is depicted as being ejected from the grooves (5) as visually shown by the ejection of the mud component (7A) from one of the grooves (5) as not being adherent to the elastomeric repellent layer (6). The elastomeric repellent layer (6) for FIG. 4 contained a dispersion of lignin and polytetrafluoroethylene short fibers (micro fibers) within the elastomeric layer, a portion of which is also contained on the surface of the elastomeric repellent layer (6) to provide surface lubricity and hydrophobicity. All of the tread rubber layers, including the elastomeric repellent layer (6), for this drawing were composed of diene-based elastomers.

It is readily understood by those having skill in the art that the elastomeric composition for the elastomeric layer on the surface of the tread grooves may be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, antioxidants and antiozonants, peptizing agents and reinforcing materials such as, for example, carbon black (for the black colored rubber composition). As known to those skilled in the art, depending on the intended use of the sulfur vulcanizable and sulfur vulcanized material (rubbers), the additives mentioned above are selected and commonly used in conventional amounts.

Representative of phenolic antidegradants for use in this invention are, for example, antioxidants such as polymeric hindered phenol, Wingstay® HLS available from The Goodyear Tire & Rubber Company, including phenolic antidegradants disclosed in *The Vanderbilt Rubber Handbook* (1978), Pages 344 through 346. Other non-staining antidegradants such as poly(oxyalkylene)amine known as OZONOX RP-2 available from Sovereign Chemical Company and cyclic acetal known as Vulkazone AFS available from Bayer A.G., can be considered part of this invention.

Representative non-aromatic rubber processing oils for use in this invention, namely such oils which contain less than 15 weight percent aromatic compounds, if at all, are, and for example, contain 46 percent to 51 percent content and 36 percent to 42 percent naphthenic content.

Typical amounts of fatty acids, if used which can include stearic acid, comprise about 0.5 to about 5 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.0, phr. In another embodiment, combinations of a primary and a secondary accelerator might be used with the secondary accelerator usually being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can preferably be accomplished by the aforesaid sequential mixing process. For example, the ingredients may be mixed in at least two stages, namely, at least one non-productive (preparatory) stage followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

The invention may be better understood by reference to the following examples in which the parts and percentages are by weight unless otherwise indicated.

EXAMPLE I

In this Example, elastomeric compositions were evaluated containing dispersions of lubricant and hydrophobic materials to provide a repellent surface for the elastomeric compositions.

Control rubber Sample A was a Comparative Control rubber Sample for Experimental rubber Samples B through E. It did not contain an added lubricant or hydrophobic material.

Experimental rubber Samples B through E contained various lubricant and/or hydrophobic materials.

For Experimental rubber Samples F and G, a different combination of elastomers and rubber reinforcing carbon black was used to achieve a faster wearing rubber composition with lubricant and/or hydrophobic properties. The was no Control rubber Sample for Experimental rubber Samples F and G.

In particular, Experimental rubber Samples B through E contained lignin, or polytetrafluoroethylene powder, or polytetrafluoroethylene short fibers or a combination of lignin and polytetrafluoroethylene short fibers, respectively.

For these Experiments, the lignin is considered herein as promoting a degree of hydrophobic property.

The polytetrafluoroethylene powder is considered herein as promoting lubricity as well as promoting some degree of hydrophobic property.

The polytetrafluoroethylene short fibers are considered herein as promoting lubricity as well as promoting some degree of hydrophobic property.

For these experiments, Elastomeric Sample F contained a combination of lignin and polytetrafluoroethylene short fibers in which:

(A) the emulsion polymerization prepared SBR (E-SBR) and cis 1,4-polybutadiene of rubber Samples A through E were replaced with a solution polymerization prepared SBR (S-SBR), and (B) the finer particle sized carbon black (N205) of rubber Samples A through E was replaced with a larger particle sized carbon black (N660) to promote less resistance to wear (faster wearing) for the rubber composition.

For these experiments, Elastomeric Sample G contained a combination of lignin and polytetrafluoroethylene short fibers in which:

(A) the emulsion polymerization prepared SBR (E-SBR), cis 1,4-polybutadiene, and a portion of the natural rubber of rubber Samples A through E, were replaced with a combination of chlorobutyl rubber and EPDM rubber, and (B) the smaller particle sized carbon black (N205) of rubber Samples A through E was replaced with a larger particle sized carbon black (N660) to promote less resistance to wear (faster wearing) for the rubber composition.

The elastomer Samples were prepared by mixing the ingredients in an internal rubber mixer in a sequential series of two non-productive (without sulfur and accelerators) mixing steps and a final productive (with sulfur and accelerator addition at a lower mixing temperature) mixing step. The elastomer compositions were dumped from the rubber mixer after each mixing step, sheeted out from an open mill and allowed to cool to below 40° C. after each mixing step.

Each of the non-productive mixing steps were for about 4 to 6 minutes to reach a temperature of about 160° C. The productive mixing step was for about 2 minutes to reach a temperature of about 115° C.

Table 1 illustrates the elastomer compositions of comparative Control Sample A and Experimental elastomer Samples B through G. The parts and percentages are by weight unless otherwise indicated.

TABLE 1

| | Samples | | | | | | |
|---|---|---|---|---|---|---|---|
| | Control A | B | C | D | E | F | G |
| First Non-Productive Mixing Step, NP1 (to 160° C.) | | | | | | | |
| Natural rubber (SMR20) | 50 | 50 | 50 | 50 | 50 | 50 | 30 |
| E-SBR styrene/butadiene rubber[1] | 25 | 25 | 25 | 25 | 25 | 0 | 0 |
| S-SBR styrene/butadiene rubber[2] | 0 | 0 | 0 | 0 | 0 | 50 | 0 |
| Cis 1,4-Polybutadiene[3] | 25 | 25 | 25 | 25 | 25 | 0 | 0 |
| Chlorobutyl rubber[4] | 0 | 0 | 0 | 0 | 0 | 0 | 65 |
| EPDM rubber[5] | 0 | 0 | 0 | 0 | 0 | 0 | 5 |
| Lignin[6] | 0 | 10 | 0 | 0 | 10 | 10 | 10 |
| Polytetrafluoroethylene powder[7] | 0 | 0 | 10 | 0 | 0 | 0 | 0 |
| Polytetrafluoroethylene fibers[8] | 0 | 0 | 0 | 10 | 10 | 10 | 10 |
| Carbon black (N205)[9] | 60 | 60 | 60 | 60 | 60 | 0 | 0 |
| Carbon black (N660)[9] | 0 | 0 | 0 | 0 | 0 | 60 | 50 |
| Rubber processing oil | 5 | 0 | 5 | 5 | 0 | 10 | 4.5 |
| Rubber processing wax | 1.5 | 1.5 | 1.5 | 1.5 | 1.5 | 1.5 | 1.5 |
| Antioxidant[10] | 2.8 | 2.8 | 2.8 | 2.8 | 2.8 | 2.8 | 2.5 |
| Zinc oxide | 1.5 | 1.5 | 1.5 | 1.5 | 1.5 | 1.5 | 1.5 |
| Fatty acid[11] | 2 | 2 | 2 | 2 | 2 | 2 | 0 |

TABLE 1-continued

|  | Samples | | | | | | |
|---|---|---|---|---|---|---|---|
|  | Control A | B | C | D | E | F | G |
| Second Non-Productive Mixing Step, NP2 (to 160° C.) | | | | | | | |
| No ingredients added | | | | | | | |
| Productive Mixing Step, P (to 115° C.) | | | | | | | |
| Zinc oxide | 1.5 | 1.5 | 1.5 | 1.5 | 1.5 | 1.5 | 1.5 |
| Accelerators[12] | 1.3 | 1.3 | 1.3 | 1.3 | 1.3 | 1.3 | 1.9 |
| Sulfur | 1.5 | 1.5 | 1.5 | 1.5 | 1.5 | 1.5 | 0 |

[1]Aqueous emulsion polymerization prepared styrene/butadiene rubber (E-SBR) as PLF1712C ™ from the Goodyear Tire & Rubber Company as an oil-extended rubber composed of 100 parts rubber and 37.5 parts oil reported in the Table in terms of the rubber component
[2]Solution polymerization prepared styrene/butadiene rubber (S-SBR) as SLR4601 ™ from Dow Chemicals.
[3]Polybutadiene rubber as BUD1207 from the Goodyear Tire & Rubber Company
[4]Chlorobutyl rubber as Chlorobutyl HT ™-10-66 from ExxonMobil
[5]EPDM (ethylene/propylene/non-conjugated diene rubber) as Royalene ™ 505 from Uniroyal Chemical
[6]Lignin as Indulin AT from the MeadWestvaco Corporation
[7]Polytetrafluoroethylene powder as nanoFlon ™ PA030 from Shamrock Technologies
[8]Polytetrafluoroethylene short fibers as Fluoro PTFE Microfibers ™ from Shamrock Technologies reportedly having an average length in a range of from about 40 to about 90 microns and an approximate apparent bulk density in a range of from about 200 to about 250 g/cc.
[9]N205 and N660 rubber reinforcing carbon blacks, an ASTM designation, with the N660 carbon black having a lesser rubber reinforcing capability and therefore forming a rubber composition with reduced wear resistance (faster wearing).
[10]Antioxidant as mixed aryl-p-phenylenediamines and N-(1,3-dimethyl butyl)-N'-phenyl-p-phenylene diamine
[11]Primarily stearic acid
[12]Sulfenamide, benzothiazyl disulfide and flaked alkylphenol disulfide sulfur cure accelerators The rubber compositions of Table 1, where appropriate, were cured for about 14 minutes at about 160° C. Various resulting physical properties are shown in the following Table 2.

TABLE 2

|  | Samples | | | | | | |
|---|---|---|---|---|---|---|---|
|  | Control A | B | C | D | E | F | G |
| Natural rubber | 50 | 50 | 50 | 50 | 50 | 50 | 30 |
| E-SBR rubber | 25 | 25 | 25 | 25 | 25 | 0 | 0 |
| S-SBR rubber | 0 | 0 | 0 | 0 | 0 | 50 | 0 |
| Cis 1,4-polybutadiene rubber | 25 | 25 | 25 | 25 | 25 | 0 | 0 |
| Chlorobutyl rubber | 0 | 0 | 0 | 0 | 0 | 0 | 65 |
| EPDM rubber | 0 | 0 | 0 | 0 | 0 | 0 | 5 |
| Lignin | 0 | 10 | 0 | 0 | 10 | 10 | 10 |
| Polytetrafluoroethylene powder | 0 | 0 | 10 | 0 | 0 | 0 | 0 |
| Polytetrafluoroethylene short fibers | 0 | 0 | 0 | 10 | 10 | 10 | 10 |
| Carbon black (N205) | 60 | 60 | 60 | 60 | 60 | 0 | 0 |
| Carbon black (N660) | 0 | 0 | 0 | 0 | 0 | 60 | 50 |
| Rheometer, 160° C. | | | | | | | |
| Maximum torque (dNm) | 18.1 | 20.6 | 15.4 | 18.2 | 20.5 | 13.6 | 10.9 |
| Minimum torque (dNm) | 3.3 | 4.5 | 3 | 3.7 | 4.8 | 1.8 | 2.9 |
| Delta torque (dNm) | 14.8 | 16.1 | 12.4 | 14.6 | 15.7 | 11.8 | 8 |
| T90, minutes | 6.7 | 6.8 | 7.1 | 6.8 | 7.2 | 13.8 | 37 |
| Stress-strain | | | | | | | |
| Tensile strength (MPa) | 20 | 19 | 18 | 18 | 18 | 16 | 11 |
| Elongation at break (%) | 592 | 553 | 621 | 561 | 533 | 537 | 530 |
| 100% modulus, ring (MPa) | 1.6 | 2 | 1.4 | 1.8 | 2.2 | 1.8 | 1.4 |
| 300% modulus, ring (MPa) | 8 | 9.4 | 6.4 | 8.1 | 9.3 | 9.1 | 6.3 |
| Rebound | | | | | | | |
| 23° C. | 38 | 37 | 37 | 37 | 37 | 38 | 21 |
| 100° C. | 54 | 52 | 52 | 52 | 50 | 65 | 55 |
| Hardness, Shore A | | | | | | | |
| 23° C. | 68 | 74 | 65 | 71 | 75 | 65 | 60 |
| 100° C. | 59 | 63 | 55 | 60 | 64 | 55 | 49 |
| DIN abrasion, relative volume loss[1] | 90 | 120 | 81 | 112 | 129 | 188 | 209 |
| Pendulum skid (wet) wet skid vs reference[2] | 54 | 51 | 54 | 51 | 52 | 65 | 59 |

TABLE 2-continued

|  | Samples | | | | | | |
| --- | --- | --- | --- | --- | --- | --- | --- |
|  | Control A | B | C | D | E | F | G |
| Coefficient of Friction (COF)[3] | | | | | | | |
| Average COF (dry substrate) | 3 | 2.3 | 3.4 | 2.5 | 2.3 | 3.2 | 3.1 |
| Average COF (wet substrate) | 2.9 | 2.7 | 2.1 | 1.4 | 1.6 | 1.1 | 1 |
| Soil-rubber adhesion, adhesion force (N)[4] | 2.8 | 2.8 | 2.2 | 1.7 | <0.6 | — | — |

[1]ASTM D5963
[2]ASTM E303
[3]ASTM D-1894. A coefficient of friction (COF) value for a rubber sample may be measured, for example, on a Model SP-2000 Slip/Peel tester from IMASS Inc at 6 inches (about 15.2 cm) per minute using a 200 g sled against a substrate surface such as, for example, a polished aluminum surface
[4]USDA-ARS-National Soil Dynamics Lab, Auburn, Alabama, USA, Dec. 20, 2006; "Soil-Rubber Adhesion Tests Conducted Using Lugged Rubber Samples" in which Hurricane water content of the Hurricane clay at its "sticky point" was 46.8 percent on a dry basis. The soil water content (percent dry basis) is calculated as 100% times (Mass of soil before drying less Mass of the oven dried soil) divided by the (Mass of the oven dried soil). The Adhesion Force is reported in Table 2 as the peak tensile force in Newtons applied by the soil to the rubber sample when the rubber sample was pulled up and away from the soil From Table 2, it can be seen that improved dry coefficients of friction were shown for Experimental rubber Samples B, D and E, as compared to their Control rubber Sample A.

From Table 2, it can also be seen that improved, or lower, wet coefficients of friction were shown for Experimental rubber Samples B through G as compared to Control rubber Sample A. This reflects a high degree of water repellency of the rubber compound.

In a preferred embodiment of the invention, the rubber composition has a wet coefficient of friction of less than about 2 for what is considered herein as being an optimal performance insofar as water repellency of wet substrates is concerned for the tire groove surfaces.

From Table 2, it can further be seen that Experimental rubber Samples C, D and E exhibited significantly reduced soil-rubber adhesion as compared to their Control rubber Sample A.

From Table 2, it can particularly be seen that Experimental rubber Samples F and G, containing the alternative rubber reinforcing carbon black and adjustments to the polymer blend, exhibited significantly increased DIN abrasion values (significantly less resistant to wearing and therefore faster wearing) while still providing good wet coefficients of friction.

Accordingly, from Table 2 it is concluded that the use of lubricant, hydrophobic materials or their combination can provide acceptable wet coefficients of friction and in some cases also good dry coefficients of friction for rubber compositions for tire tread groove surfaces. It is also demonstrated that various elastomer and carbon black filler (e.g. larger particle sized carbon black such as for example N550, N650 and N754 carbon blacks) choices can be used to provide faster rubber wear rates while still having acceptable wet coefficient of friction values.

While various embodiments are disclosed herein for practicing the invention, it will be apparent to those skilled in this art that various changes and modifications may be made therein without departing from the spirit or scope of the invention.

What is claimed is:

1. A tire having a rubber tread configured with lugs and grooves wherein the outer surface of the tread lugs comprise the running surface of the tread and at least a portion of the tread groove walls are comprised of a thin water repellent layer co-vulcanized with the rubber tread where said water repellent layer has a thickness in a range of from about 0.05 to about 2.5 mm;
   wherein the said water repellent layer is substantially exclusive of said running surface of the tread, and
   wherein said water repellent layer on the tread groove walls is comprised of a rubber composition, based on parts by weight per 100 parts of rubber (phr):
   (A) at least one conjugated diene based elastomer and
   (B) a dispersion within said elastomer(s) of said water repellent layer and on the visible surface of said water repellent layer comprised of from about 2 to about 50 phr of a combination of lignin and hydrophobic polytetrafluoroethylene short fibers,
   wherein said conjugated diene-based elastomer is selected from at least one of polymer(s) of at least one of isoprene and 1,3-butadiene and copolymer of styrene with at least one of isoprene and 1,3-butadiene.

2. The tire of claim 1 wherein said water repellent layer is a mud repellent layer.

* * * * *